United States Patent Office 3,049,537
Patented Aug. 14, 1962

3,049,537
WATER-SOLUBLE CELLULOSE ETHERS AND PROCESS
Eugene D. Klug, Wilmington, Del., and William D. Roberson, Hopewell, Va., assignors to Hercules Powder Company, Wilmington, Del., a corporation of Delaware
No Drawing. Filed Mar. 21, 1960, Ser. No. 16,135
14 Claims. (Cl. 260—232)

This invention relates to water-soluble hydroxyalkyl cellulose ethers and process of preparing and more particularly to the purification of water-soluble hydroxyalkyl cellulose ethers, e.g. hydroxyethyl cellulose. One embodiment of the invention relates to hydroxyethyl cellulose of substantially improved color stability and process of preparing.

The invention will be described for the most part with reference to preparing water-soluble hydroxyethyl cellulose. Heretofore one method for preparing hydroxyethyl cellulose has been by steeping cellulosic material such as cotton linters or wood pulp in alkali, etherifying the resulting alkali cellulose at elevated temperature and pressure, neutralizing the excess alkali (usually sodium hydroxide) with acetic acid or hydrochloric acid, removing the impurities, and drying to obtain the final hydroxyethyl cellulose product. The impurities to be removed are mostly the salts formed by neutralization of the alkali with the acid, i.e., sodium acetate or sodium chloride. There are also some impurities in the form of glycols, polymer and color bodies.

Although hydroxyethyl cellulose is a well-established commercial product having many important industrial uses and although its preparation has been improved considerably in the past, there are still difficulties involved in its preparation. One serious difficulty encountered is in purifying the hydroxyethyl cellulose. At the substitution levels, e.g. 1–3 MS, required for most uses the product is so soluble in the water and other solvents one would like to use for purifying that it is not commercially feasible to use such solvents. MS is the moles of etherifying agent (e.g., alkylene oxide) substituted per anhydroglucose unit of the cellulose molecule and is determined by the familiar Zeisel-Morgan method. The best prior art purification solvent of which we are aware is about 70%–80% aqueous acetone, but the use of this solvent has a number of drawbacks. It would be much better if the hydroxyethyl cellulose were less soluble and the impurities were more soluble in the purification solvent. Another serious difficulty, especially where the hydroxyethyl cellulose is used for making films or as coatings generally, is the tendency of the product to become colored. This problem is even more serious where the product is subjected to elevated temperature, e.g. during storage or use.

An object of the present invention is to provide improved water-soluble hydroxyalkyl cellulose ethers and process of preparing. A further object is an improved process of purifying water-soluble hydroxyalkyl cellulose ethers, including hydroxyethyl cellulose. Another object is to provide hydroxyethyl cellulose of increased resistance to becoming colored and process of making. A still further object is to overcome the prior art difficulties described hereinbefore. These and other objects will be apparent from the description of this invention given hereinafter.

The above and other objects are accomplished according to the present invention by carrying out the process which comprises preparing a water-soluble cellulose ether by etherifying cellulose in the presence of alkali, neutralizing the excess alkali with an acid, and washing the cellulose ether with a solvent, the combination of acids, and solvents employed being selected from the group consisting of (1) propionic acid in combination with a solvent selected from the group consisting of 70%–90% aqueous solutions of isopropyl alcohol, tertiary butyl alcohol and secondary butyl alcohol, and (2) benzoic acid, nitric acid and acetic acid-nitric acid mixture in combination with a solvent selected from the group consisting of 70%–90% aqueous solutions of isopropyl alcohol, tertiary butyl alcohol, secondary butyl alcohol, acetone and dioxane.

The crux of the invention is the finding, quite to our surprise, that in the presence of the products of this invention the solubility of the impurities in the solvents is many times what the artisan would expect from the relative solubility of the same impurities in the same solvents in the absence of the products of this invention when compared with the solubility of prior art salts under the same conditions.

The following examples illustrate specific embodiments of this invention but are not intended to limit it to any greater extent than do the appended claims. The MS of the hydroxyethyl cellulose used was 2.5–2.7. Unless otherwise specified, examples were carried out at about 25° C. The acetic acid used was glacial acetic acid. In the examples the following abbreviations are used: IPA is isopropyl alcohol, TBA is tertiary butyl alcohol, SBA is secondary butyl alcohol and HEC is hydroxyethyl cellulose.

EXAMPLE 1

(Table 1)

This example was carried out primarily to confirm the surprising improvements in purification over the prior art which we obtained with the combination of acids and solvents defined hereinbefore. The main object here was to determine what effect, if any, the presence of hydroxyethyl cellulose had on the solubility of the impurities in the solvents used. In order to determine this, five different solvents were prepared as 80% concentrations thereof in water and each was divided into equal portions, forming two sets of identical solvents. These solvents were isopropyl alcohol, tertiary butyl alcohol, secondary butyl alcohol, acetone and dioxane. To each of the solvents in one set was added ten grams of hydroxyethyl cellulose (dry basis) for each 100 grams of the aqueous solvent. Then it was determined how many grams of sodium chloride, sodium acetate, sodium propionate, sodium nitrate and sodium benzoate would dissolve in each of these solvents under the same conditions, room temperature and pressure and mild agitation being employed. Table 1 below gives further details.

TABLE 1 (Example 1)

| Sodium Salts | Solubility in Solvent Alone [1] | | | | |
|---|---|---|---|---|---|
| | IPA | TBA | SBA | Acetone | Dioxane |
| Chloride | 2 | 4 | 5 | 3 | 4 |
| Acetate | 11 | 14 | 17 | 14 | 18 |
| Propionate | 17 | 15 | 20 | | |
| Nitrate | 4 | 11 | 12 | 11 | 11 |
| Benzoate | 7 | 8 | 13 | 10 | 11 |

| | Solubility in Solvent-HEC Mixture [1] | | | | |
|---|---|---|---|---|---|
| Chloride | 0.8 | 0.2 | 0.1 | 0.4 | 0.2 |
| Acetate | 3.2 | 0.4 | 0.2 | 0.4 | 0.2 |
| Propionate | 7.0 | 5.4 | 5.6 | | |
| Nitrate | 1.7 | 0.8 | 0.3 | 5.5 | 1.9 |
| Benzoate | 3.4 | 4.4 | 6.3 | 6.0 | 5.0 |

[1] G. salt/100 g. 80% aqueous solvent.

From the data in this Example 1 above it will be seen that the presence of hydroxyethyl cellulose in the solvent used had a pronounced effect on the solubility of the impurities in that solvent. It will also be seen from these data that the effect is quite surprising.

In the following examples the same conventional procedure as described in paragraph two of the present application was used in preparing the cellulose ethers. Then each ether was purified as shown in the following examples.

EXAMPLE 2

(Table 2)

This example compares the purification results obtained with different combinations of acids and solvents.

Unneutralized hydroxyethyl cellulose in a tertiary butyl alcohol slurry containing about 0.19 pound sodium hydroxide per pound of hydroxyethyl cellulose was divided into 3 portions. The hydroxyethyl cellulose used had a viscosity of 500 cps. in 2% aqueous solution at 25° C. The concentration of hydroxyethyl cellulose was about 12% by weight of the slurry. One portion was neutralized with 37% hydrochloric acid, another was neutralized with 70% nitric acid and the other was neutralized with 100% propionic acid. Each portion was centrifuged and 225 grams of the centrifuged cake washed 6 or 7 times (Table 2) with the solvent, using about 2 liters of solvent for each wash. 80% aqueous acetone was the solvent used for the hydrochloric acid and the nitric acid neutralized materials, and 80% aqueous tertiary butyl alcohol was the solvent used for the propionic acid neutralized material. The solvent was removed after each wash by siphoning, and then the sulfate ash was determined on a small sample after drying.

Table 2 below gives further details.

TABLE 2 (Example 2)

| Wash No. | Neutralizing Acid | | | | | |
|---|---|---|---|---|---|---|
| | Hydrochloric, cumulative total | | Nitric, cumulative total | | Propionic, cumulative total | |
| | Gal. 80% Aqueous Acetone per lb. pure dry HEC | Percent Sulfate Ash | Gal. 80% Aqueous Acetone per lb. pure dry HEC | Percent Sulfate Ash | Gal. 80% Aqueous TBA per lb. pure dry HEC | Percent Sulfate Ash |
| 0 | None | [1] 23.4 | 0 | [1] 19.4 | 0 | [1] 16.6 |
| 1 | 1.32 | 19.4 | 1.39 | 11.4 | 1.37 | 10.6 |
| 2 | 2.64 | 13.9 | 2.78 | 5.5 | 2.75 | 6.4 |
| 3 | 3.96 | 9.4 | 4.17 | 2.7 | 4.12 | 3.6 |
| 4 | 5.28 | 6.0 | 5.56 | 1.4 | 5.50 | 1.9 |
| 5 | 6.60 | 5.1 | 6.95 | 0.77 | 6.87 | 1.1 |
| 6 | 7.92 | 2.7 | 8.33 | 0.38 | 8.25 | 0.49 |
| 7 | 9.24 | 2.0 | | | 9.62 | 0.33 |

[1] Determined on the dry HEC after neutralization in the etherification slurry prior to any washing. They indicate the relative solubility of the salts of neutralization in the spent reaction solvent.

The data in this Example 2 above show the decided advantage in solvent savings and consequent time savings of using nitric acid or propionic acid of this invention as compared with using prior art hydrochloric acid. These advantages are realized at all ash levels.

EXAMPLE 3

(Table 3)

This example shows reducing the viscosity of hydroxyethyl cellulose before purification according to this invention using single acids to neutralize.

Unneutralized hydroxyethyl cellulose in an aqueous tertiary butyl alcohol slurry containing about 0.19 pound sodium hydroxide per pound hydroxyethyl cellulose was divided into two portions. The hydroxyethyl cellulose viscosity was about 10,000 cps. in 5% aqueous solution at 25° C. The concentration of hydroxyethyl cellulose was about 12% by weight of the slurry. One portion was neutralized with 70% nitric acid, and the other portion was neutralized with 100% propionic acid. In order to reduce the viscosity of the hydroxyethyl cellulose, some of each neutralized slurry containing about 0.75 pound of pure hydroxyethyl cellulose (dry basis) was heated to 60° C. and 4.25% hydrogen peroxide (by weight of the hydroxyethyl cellulose on a dry basis) was added as a 5.8% aqueous solution, and the slurry was maintained at 60° C. for 90 minutes. The tertiary butyl alcohol which had been used as the reaction medium or diluent for preparing the hydroxyethyl cellulose was siphoned from both the nitric acid neutralized portion and the propionic acid neutralized portion. The resulting cake from the nitric acid neutralized portion was dissolved in 0.264 gallon of 50% aqueous acetone and then precipitated therefrom by adding thereto 0.330 gallon of anhydrous acetone. The resulting cake from the propionic acid neutralized portion was dissolved in 0.264 gallon of 50% aqueous tertiary butyl alcohol and then precipitated therefrom by adding thereto 0.330 gallon of 88% aqueous tertiary butyl alcohol. This procedure of dissolving the hydroxyethyl cellulose in the solvent and then precipitating it from the solvent was carried out a total of four times and the sulfate ash was determined after each time; after the last such treatment the nitric acid neutralized hydroxyethyl cellulose was washed with 0.53 gallon of anhydrous acetone to harden the grain, and the percent sulfate ash was determined after the hardening treatment.

Table 3 below gives further details.

TABLE 3 (Example 3) [1]

| Wash No. | Neutralizing Acid | | | |
|---|---|---|---|---|
| | Nitric, cumulative total | | Propionic, cumulative total | |
| | Gal. 80% Aqueous Acetone per lb. pure dry HEC | Percent Sulfate Ash | Gal. 80% Aqueous TBA per lb. pure dry HEC | Percent Sulfate Ash |
| 0 | None | [2] 20.2 | None | [2] 17.6 |
| 1 | 0.79 | 12.1 | 0.79 | 12.2 |
| 2 | 1.57 | 8.7 | 1.57 | 9.2 |
| 3 | 2.36 | 6.4 | 2.36 | 6.5 |
| 4 | 3.85 | 3.2 | 3.15 | 4.3 |

[1] The viscosity of the HEC started with was about 10,000 cps. in 5% aqueous solution at 25° C. After contacting 90 minutes at 60° C. with hydrogen peroxide, the viscosity of the nitric acid neutralized HEC and the propionic acid neutralized HEC was 290 cps. and 50 cps., respectively, in 5% aqueous solution at 25° C.
[2] Determined on the dry HEC after neutralization in the etherification slurry prior to any washing. They indicate the relative solubility of the salts of neutralization in the spent reaction solvent.

The data in this Example 3 above show that the present invention is also applicable to purifying hydroxyethyl cellulose by dissolving it in a solvent and then precipitating it from the solvent, instead of washing the impurities out of the slurrry as in Example 2 above. This Example 3 when compared with Example 2 above also shows that the purification efficiency of this invention is still quite high even when purifying low viscosity hydroxyethyl cellulose.

EXAMPLE 4

(Table 4)

This example illustrates the viscosity reduction of hydroxyethyl cellulose before purification according to this invention, using a mixture of nitric acid and acetic acid to neutralize.

Unneutralized hydroxyethyl cellulose in an aqueous tert-butyl alcohol slurry containing about 0.2 pound sodium hydroxide per pound of hydroxyethyl cellulose was divided into two portions. The hydroxyethyl cellulose viscosity in 5% aqueous solution at 25° C. was 9000 cps. The concentration of hydroxyethyl cellulose was about 12% by weight of the slurrry. One portion was neutralized with acetic acid, the other with 70% nitric acid. A part of each of these neutralized slurries was mixed together in the proportions necessary to represent 0, 90, 95, 98 and 100% nitric acid and the remaining percent neutralization with acetic acid, thus giving five samples. In order to reduce the viscosity of the hydroxyethyl cellulose in each of these five samples, the slurries were heated to 60° C. and 7.5% hydrogen peroxide (by weight of the hydroxyethyl cellulose on a dry, purified basis) was added as a 6% aqueous solution and the samples maintained at 60° C. for 180 minutes. The samples were cooled to about 25° C. To Samples 2–4 70% nitric acid was added in an amount stoichiometric to the amount of sodium acetate formed in the neutraliation. Since Sample 1 is included to illustrate prior art procedure, only acetic acid was used.

The tertiary butyl alcohol which had been used as the reaction medium or diluent for preparing the hydroxyethyl cellulose was siphoned from the sample. The resulting cake was dissolved in 0.4 gal. 50% aqueous acetone/lb. pure dry hydroxyethyl cellulose and then reprecipitated therefrom by adding thereto 0.5 gal. 100% acetone/lb. pure dry hydroxyethyl cellulose, thereby giving a total of 0.9 gal. washing solvent/lb. pure dry hydroxylethyl cellulose per wash. This procedure of dissolving the hydroxyethyl cellulose in the solvent and then precipitating it from the solvent was carried out a total of 4–7 times and the sulfate ash was determined after each wash.

Table 4 below gives further details.

TABLE 4
(Example 4)

| Sample No. | Percent Neutralization with— | | Viscosity[1] cps. | Wash No. | Cumulative Total, Gal. 80% Aqueous TBA per lb. pure dry HEC | Percent Sulfate Ash |
|---|---|---|---|---|---|---|
| | Nitric Acid | Acetic Acid | | | | |
| 1 | 0 | 100 | 8 | 1 | 0.9 | 18.6 |
| | | | | 2 | 1.8 | 14.6 |
| | | | | 3 | 2.7 | 10.6 |
| | | | | 4 | 3.6 | 7.6 |
| | | | | 5 | 4.5 | 4.8 |
| | | | | 6 | 5.4 | 3.2 |
| | | | | 7 | 6.3 | 2.2 |
| 2 | 90 | 10 | 45 | 1 | 0.9 | 12.9 |
| | | | | 2 | 1.8 | 7.2 |
| | | | | 3 | 2.7 | 3.6 |
| | | | | 4 | 3.6 | 1.7 |
| 3 | 95 | 5 | 150 | 1 | 0.9 | 13.8 |
| | | | | 2 | 1.8 | 9.0 |
| | | | | 3 | 2.7 | 5.7 |
| | | | | 4 | 3.6 | 3.4 |
| 4 | 98 | 2 | 280 | 1 | 0.9 | 13.0 |
| | | | | 2 | 1.8 | 8.6 |
| | | | | 3 | 2.7 | 4.6 |
| | | | | 4 | 3.6 | 2.6 |
| 5 | 100 | 0 | 1,060 | 1 | 0.9 | 13.5 |
| | | | | 2 | 1.8 | 7.8 |
| | | | | 3 | 2.7 | 4.8 |
| | | | | 4 | 3.6 | 3.5 |

[1] Viscosity in 5+ aqueous solution at 25° C. after treating 180 min. at 60° C. with $H_2O_2$. The viscosity of the HEC started with was 9000 cps. in 5+ aqueous solution at 25° C.

This Example 4 above shows that when using nitric acid the addition of acetic acid expedites the production of a lower viscosity hydroxyethyl cellulose product without any substantial sacrifice in the purification efficiency gained with the single acids of this invention.

EXAMPLE 5

Color Stability (Table 5)

Four samples of hydroxyethyl cellulose were prepared by the same procedure except as indicated in Table 5 below. Each of these 4 samples were divided into equal portions. 2% aqueous solutions were made from one of the portions of each sample. The other portion of each of the 4 samples was baked for 5 hours in an oven maintained at 248° F. Then these baked samples were cooled to approximately room temperature and 2% aqueous solutions were prepared from them as with the unbaked samples. These solutions were compared with A.P.H.A (American Public Health Association) color standards, and the solution color of each was determined by a photoelectric filter photometer. Solution color is reported in Table 5 below as A.P.H.A. parts per million (p.p.m.) platinum as determined by the photometer and also as descriptive word color designation as observed visually. As will be seen, the higher the color number the more colored the product. Color differences are readily determined visually within 25 p.p.m. platinum (ASTM D1209–50).

Table 5 below gives further details.

TABLE 5 (Example 5)

| Sample No. | 2% Viscosity at 25° C., cps. | Acid of Neutralization | A.P.H.A. Solution Color, p.p.m. Pt | | Descriptive Word Color Designation | |
|---|---|---|---|---|---|---|
| | | | Unheated | Heated | Unheated | Heated |
| 1 | 10 | Acetic | 30 | 380 | Substantially colorless. | Dark yellow. |
| 2 | 12 | 90% nitric- 10% acetic. | 20 | 180 | ----do---- | Yellow. |
| 3 | 210 | HCl | 20 | 110 | ----do---- | Light yellow. |
| 4 | 220 | 96.5% nitric- 3.5% acetic. | 30 | 50 | ----do---- | Slight yellow tint. |

From this Example 5 above together with Examples 2 and 3, it is readily apparent that the use of nitric acid in the purification of hydroxyethyl cellulose according to this invention not only gives a much more efficient purification than do prior art acids but that it also gives a product which is far more resistant to color degradation at elevated temperature. The latter is very important especially where the hydroxyethyl cellulose product is used to make films or as coatings generally. As will be seen, the color problem is more pronounced with the lower viscosity hydroxyethyl cellulose products.

This invention has been described hereinbefore with reference to particular embodiments thereof but it is not intended that the invention be restricted thereto. As those skilled in this art know, a number of changes can be made in these specific embodiments without departing from the invention.

Example 4 hereinbefore shows that when nitric acid is used and a lower viscosity hydroxyethyl cellulose is desired, viscosity reduction can be appreciably facilitated by using some acetic acid in combination with the nitric acid. The amount of acetic acid used depends on two factors. Cost-wise it is desirable to use a minimum of acetic acid because less nitric is then required to convert the sodium acetate formed during neutralization to free acetic acid. It is even possible, by using very small amounts of acetic acid, to eliminate the extra addition of nitric acid since the small amount of sodium acetate present can be removed as such with the sodium nitrate without any substantial loss in purification efficiency. As already indicated, another reason for using the minimum amount of acetic acid is in order to obtain the greatest benefit of this invention in the form of purification efficiency. On the other hand, making low viscosity hydroxyethyl cellulose favors the use of larger proportions of acetic acid. We prefer to use as the acid mixture about 2%–10% acetic acid and about 98%–90% nitric acid, respectively. However, one may operate outside this range within the scope of this invention. We have obtained good results with an 80% nitric–20% acetic mixture. If low viscosity product is not needed, one of course could practice the embodiment of our invention wherein nitric acid is the sole acid used. It will be noted that substituting only 2% of the nitric acid with acetic acid produced a very great reduction in viscosity. If one's requirements called for less viscosity reduction, less than 2% acetic acid would be satisfactory.

We prefer to operate using a solvent concentration of about 70%–90% solvent in water. Below about 70% the hydroxyethyl cellulose is undesirably soluble and there is a tendency for it to become gummy. Above about 90% the solubility of the salts in the solvent is undesirably low.

Although we have described our invention in large part with reference to processes of making hydroxyethyl cellulose which employ the well-known aqueous slurry technique, the invention is by no means limited thereto but is applicable to any process where it is necessary or desirable to purify the hydroxyethyl cellulose.

The present invention has many advantages. Use of the single acids, nitric, propionic or benzoic, enables up to 50% savings in solvent usage and distillation costs. Use of mixtures of nitric and acetic acids provides a means of making very low viscosity hydroxyethyl cellulose without any substantial sacrifice in the purification efficiency gained with the single acids of this invention. The use of nitric acid as the sole acid has the additional advantage of imparting color stability to the hydroxyethyl cellulose; this also applies to the use of nitric acid in combination with relatively small amounts of acetic acid (e.g., about 2%–20% acetic acid) for preparing low viscosity hydroxyethyl cellulose.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. In the process of preparing water-soluble hydroxyalkyl cellulose ethers wherein cellulosic material is contacted with a base, the cellulosic material is etherified, and the cellulose ether is purified by neutralizing the base and removing the salts formed and other impurities with a solvent therefor, the improvement in the purification which comprises neutralizing the base with certain acids followed by removing the impurities from the ether with certain solvents, the combination of acids and solvents being selected from the group consisting of (1) propionic acid in combination with a solvent selected from the group consisting of isopropyl alcohol, tertiary butyl alcohol, and secondary butyl alcohol, and (2) benzoic acid, nitric acid, and acetic acid-nitric acid mixture in combination with a solvent selected from the group consisting of isopropyl alcohol, tertiary butyl alcohol, secondary butyl alcohol, acetone, and dioxane, each of said solvents in (1) and (2) above being employed as 70%–90% aqueous solutions thereof, the proportions of acids in said acetic acid-nitric acid mixture being about 98%–80% nitric and about 2%–20% acetic by weight thereof, respectively.

2. In a slurry process of preparing water-soluble hydroxyethyl cellulose wherein cellulosic material is contacted with an alkali, the cellulosic material is etherified, the alkali treatment and etherification being carried out in the presence of an inert organic diluent or slurry medium, and the cellulose ether is purified by neutralizing the alkali and removing the salts formed and other impurities with a solvent therefor, the improvement in the purification which comprises neutralizing the alkali with certain acids followed by washing the ether with certain solvents, the combination of acids and solvents being selected from the group consisting of (1) propionic acid in combination with a solvent selected from the group consisting of isopropyl alcohol, tertiary butyl alcohol, and secondary butyl alcohol, and (2) benzoic acid, nitric acid, and acetic acid-nitric acid mixture in combination with a solvent selected from the group consisting of isopropyl alcohol, tertiary butyl alcohol, secondary butyl alcohol, acetone, and dioxane, each of said solvents in (1) and (2) above being employed as 70%–90% aqueous solutions thereof, the proportions of acids in said acetic acid-nitric acid mixture being about 98%–80% nitric and about 2%–20% acetic by weight thereof, respectively.

3. The process of claim 2 wherein the neutralizing acid is propionic and the wash solvent is about 70%–90% aqueous tertiary butyl alcohol.

4. The process of claim 2 wherein the neutralizing acid is nitric and the wash solvent is about 70%–90% aqueous tertiary butyl alcohol.

5. The process of claim 2 wherein the neutralizing acid is nitric and the wash solvent is about 70%–90% aqueous acetone.

6. The process of claim 2 wherein the neutralizing acid is benzoic and the wash solvent is about 70%–90% aqueous tertiary butyl alcohol.

7. The process of claim 2 wherein the neutralizing acid is benzoic and the wash solvent is about 70%–90% aqueous acetone.

8. The process of claim 2 wherein the neutralizing acid is a mixture of nitric and acetic in the proportions of about 98%–80% nitric and about 2–20% acetic by weight thereof, respectively, and the wash solvent is about 70%–90% aqueous tertiary butyl alcohol.

9. The process of claim 2 wherein the neutralizing acid is a mixture of nitric and acetic in the proportions of about 98%–90% nitric and about 2%–10% acetic by weight thereof, respectively, and the wash solvent is about 70%–90% aqueous tertiary butyl alcohol.

10. The process of claim 2 wherein the neutralizing acid is a mixture of nitric and acetic in the proportions of about 98%–80% nitric and about 2%–20% acetic by weight thereof, respectively, and the wash solvent is about 70%–90% aqueous acetone.

11. The process of claim 2 wherein the neutralizing acid is a mixture of nitric and acetic in the proportions of about 98%–90% nitric and about 2%–10% acetic by weight thereof, respectively, and the wash solvent is about 70%–90% aqueous acetone.

12. In the process of preparing water-soluble hydroxyalkyl cellulose ethers wherein cellulosic material is contacted with a base, the cellulosic material is etherified, and the cellulose ether is purified by neutralizing the base and removing the salts formed and other impurities with a solvent therefor, the improvement which comprises neutralizing the base with nitric acid followed by removing the impurities from the ether with a solvent selected from the group consisting of isopropyl alcohol, tertiary butyl alcohol, secondary butyl alcohol, acetone, and dioxane, each of said solvents being employed as 70%–90% aqueous solutions thereof, thereby substantially increasing the purification efficiency of the process and at the same time obtaining a hydroxyalkyl cellulose ether product of substantially increased resistance to becoming colored particularly at elevated temperature.

13. In a slurry process of preparing water-soluble hydroxyethyl cellulose wherein cellulosic material is contacted with an alkali, the cellulosic material is etherified, the alkali treatment and etherification being carried out in alkali treatment and etherification being carried out in the presence of an inert organic diluent or slurry medium, and the cellulose ether is purified by neutralizing the alkali and removing salts formed and other impurities with a solvent therefor, the improvement which comprises neutralizing the alkali with nitric acid followed by removing the impurities from the ether with a solvent selected from the group consisting of isopropyl alcohol, tertiary butyl alcohol, secondary butyl alcohol, acetone, and dioxane, each of said solvents being employed as 70%–90% aqueous solutions thereof, thereby substantially increasing the purification efficiency of the process and at the same time obtaining a hydroxyethyl cellulose of substantially increased resistance to becoming colored particularly at elevated temperature.

14. In the process of preparing water-soluble hydroxyalkyl cellulose ethers wherein cellulosic material is contacted with a base, the cellulosic material is etherified, and the cellulose ether is purified by neutralizing the base and removing the salts formed and other impurities with a solvent therefor, the improvement which comprises neutralizing the base with a mixture of nitric acid and acetic acid in the proportions of about 98%–80% nitric and about 2%–20% acetic by weight thereof, respectively, followed by removing the impurities from the ether with a solvent selected from the group consisting of isopropyl alcohol, tertiary butyl alcohol, secondary butyl alcohol, acetone, and dioxane, each of said solvents being employed as 70%–90% aqueous solutions thereof, thereby substantially increasing the purification efficiency of the process and at the same time obtaining a hydroxyalkyl cellulose ether of substantially increased resistance to becoming colored particularly at elevated temperature.

References Cited in the file of this patent
UNITED STATES PATENTS

| | | |
|---|---|---|
| 1,448,091 | Seel | Mar. 13, 1923 |
| 1,941,278 | Schorger | Dec. 26, 1933 |
| 2,101,032 | Lorand | Dec. 7, 1937 |
| 2,178,630 | Finlayson | Nov. 7, 1939 |
| 2,698,254 | Spurlin | Dec. 28, 1954 |

UNITED STATES PATENT OFFICE
CERTIFICATE OF CORRECTION

Patent No. 3,049,537              August 14, 1962

Eugene D. Klug et al.

It is hereby certified that error appears in the above numbered patent requiring correction and that the said Letters Patent should read as corrected below.

Column 3, TABLE 2, sub-heading to column 6, line 4 thereof, strike out "per lb."; column 5, lines 10 to 11, for "neutraliation" read -- neutralization --; lines 20 and 21, for "hydroxylethyl" read -- hydroxyethyl --; same column 5, TABLE 4, line 1 of footnote thereof, for "5+" read -- 5% --; column 6, line 24, for "(ASTM D1209-50)" read -- (ASTM D1209-54) --; column 8, line 71, strike out "alkali treatment and etherification being carried out in".

Signed and sealed this 11th day of December 1962.

(SEAL)
Attest:

ERNEST W. SWIDER
Attesting Officer

DAVID L. LADD
Commissioner of Patents